Figure 1:
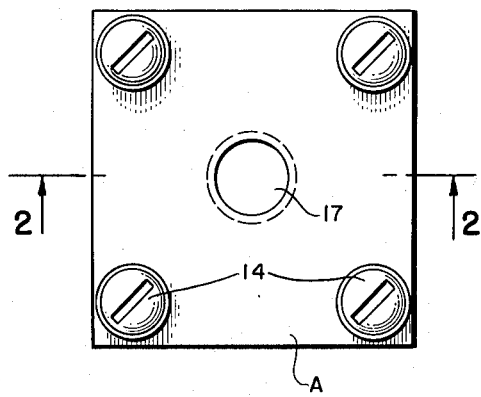

July 12, 1966     J. P. MORGAN, JR     3,260,274
SELECTOR VALVE
Filed Dec. 15, 1961

INVENTOR
Jesse P. Morgan, Jr.
BY Herbert M Birch
ATTORNEY

United States Patent Office 3,260,274
Patented July 12, 1966

3,260,274
SELECTOR VALVE
Jesse P. Morgan, Jr., Knoxville, Tenn., assignor to Robertshaw Controls Company, Richmond, Va., a corporation of Delaware
Filed Dec. 15, 1961, Ser. No. 159,587
3 Claims. (Cl. 137—113)

The present invention relates to a relay check valve and more particularly to a selector valve for a fluid control system.

Briefly, the present novel relay check valve or selector valve arrangement is used to select a signal from whichever of two incoming lines is pressurized and direct the pressurized signal to a third line or conduit without any loss of fluid through the unpressurized incoming line, which may be vented.

Heretofore, valves for similar uses have been provided, but prior art valves, such as shuttle valves or double check valves usually employ a free piston, spool or ball, which must move between two ports during operation. Valves having moving parts of this type require considerable fluid flow to operate without loss of flow through the unpressurized vented port, since the moving parts of these prior art valves have appreciable inertia because of their mass or weight.

Accordingly, an object of this invention is to provide an improvement in a selector valve, in which the moving parts are reduced to a absolute minimum, namely, one moving part having negligible inertia because of negligible mass or weight, whereby the valve may be mounted in any position and will operate reliably at very low pressures.

Yet another object is to provide in a selector valve a novel diaphragm poppet arrangement, whereby only a very slight minimum movement is needed between valve seats to provide the optimum unrestricted fluid flow through the valve.

Another object is to provide a relay selector valve for use to control fluid circuits with parallel paths adapted to automatically select the pressurized fluid flow path, close off the unpressurized flow path, and connect the selected flow path to a suitable downstream device. For example, the present relay selector valve is desirable in systems in which one flow path is used when the operation of the system is under the control of an automatic controller and a separate selected flow path is used when the system is being manually controlled.

Another example of a use for this novel valve may be for the sequence starting portion of an engine control system. Thus one of the input ports of the valve may be connected to receive a signal when the engine is being started through an automatic sequence and the other input port connected to receive a signal when the engine is being started through a manual sequence.

With the above and other objects and advantages in view, the invention consists in the construction, arrangement and combination of parts hereinafter described and particularly pointed out in the appended claims, it being understood that it is not intended to limit the invention to the details of construction.

Figure 2:
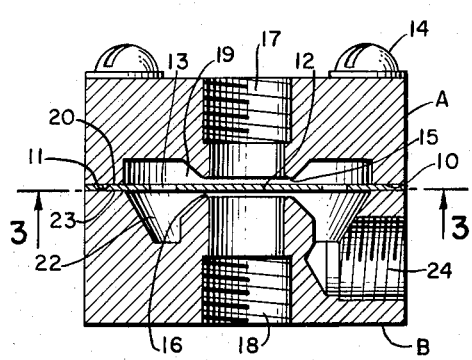
Figure 3:
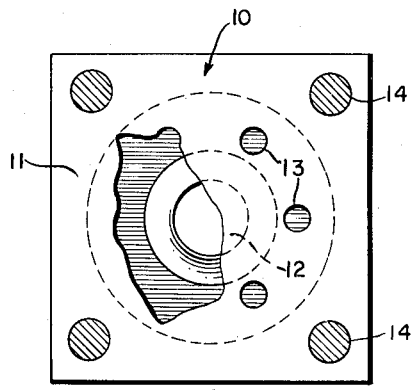
Figure 4:
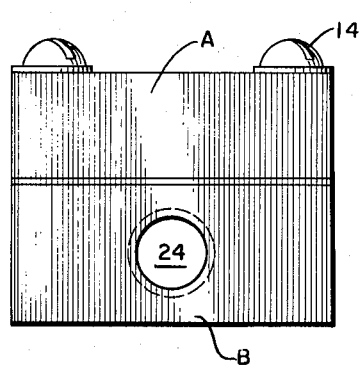

In the drawing like parts throughout the several views are given like numerals and are thus identified in the following detailed description;

FIGURE 1 is a top elevation view of the novel selector valve;
FIGURE 2 is a cross section view taken on the section line 2—2 of FIGURE 1;
FIGURE 3 is a view partly in cross section taken on the line 3—3 of FIGURE 2; and
FIGURE 4 is a side elevation view of the assembled valve.

Referring to the drawing in detail and with particular reference to FIGURE 2, the present novel valve means is comprised of two body sections A and B, a diaphragm 10 formed of suitable material such as a thin sheet of fabric, which is elastomer covered. This elastomer covered fabric diaphragm 10 functions as a gasket 11 at the opposite peripheral surfaces between the body sections and as a poppet valve 12 at the center portion, while circumventing the center poppet valve portion the diaphragm is formed with an annular ring of holes 13, see FIGURE 3.

The respective valve body sections A and B are each formed from blocks of suitable solid material, such as metal or plastic and are connected together at each corner by fastener means, such as bolts 14. These sections are formed with axially aligned ports 17 and 18 and are machined in their respective opposed inner surfaces to provide opposed and axially aligned centrally located valve seats 15 and 16, respectively. For example, valve seat 15 in section A opens into the bore of the port 17 and valve seat 16 in section B and opens into the bore of the port 18, see FIGURE 2.

The body section A is machined in provide an annular cavity 19 countersunk in a plane below valve seat 15 and to thereby provide a peripheral gasket gripping surface 20 around the peripheral wall of the annular countersunk cavity so the valve seat 15 in the cavity is in a plane spaced slightly lower than the gasket seal surface 20. The body section B is likewise machined to provide an annular cavity 22 countersunk is a plane below valve seat 16 and to thereby provide a peripheral gasket seal surface 23 around the peripheral wall of the countersunk cavity so the valve seat 16 in the cavity is in a plane spaced slightly below the plane of the gasket seal surface 23, whereby a vertical space is provided between the valve seat 15 and valve seat 16 between which the poppet section 12 of the diaphragm is movable.

The body section B is formed with a laterally extending threaded port 24 in a side wall thereof, which opens into the bottom of the cavity 22 below the valve seat 16.

When the two body sections A and B are secured together by the screws 14, the gasket seal clamping surfaces 20 and 23 of the respective sections securely clamp the diaphragm 10 at portion 11 thereof with the solid or imperforate center poppet valve portion 12 thereof between the spaced aligned valve seats 15 and 16. Also, when assembled the annular ring of holes 13 are so located that the cavities 19 and 22 are always connected and air is free to flow unrestricted between the two cavities.

As above stated the opposed valve seats 15 and 16 are spaced apart and the poppet valve portion 12 of the diaphragm 10 is movable in response to fluid pressures to engage one or the other of the said seats during the operation of the selector valve, as hereinafter described.

*Operation*

The operation is controlled by the port at which fluid pressure is introduced, for example fluid pressure introduced at port 17 will cause the diaphragm 10 to move and the poppet section 12 will seat on valve seat 16, thus preventing loss of pressure through port 18. Fluid entering at port 17 passes into cavity 19 through the circle of holes 13 in the diaphragm 10, thence to cavity 22 and finally out port 24.

If pressure is removed from the line connected to port 17, fluid passes from the line connected to port 24 into cavity 22. Then from cavity 22 fluid passes directly through the port 18 into the connecting line or through the holes 13 in diaphragm 10 to cavity 19 and thence through port 17 to the connecting line. The fluid path chosen will be through the port 17 or port 18, which is connected to a line that is vented.

If fluid pressure is introduced at port 18, with port 17 vented, the pressure of the fluid on diaphragm 10 causes it to move to seat 15, thus sealing off port 17. Fluid now passes through port 18, into cavity 22 through port 24 and thence into the line connected to port 24, thereby pressurizing the line and providing a signal to operate a valve, air motor or the like. When pressure is lost in the line connected to port 18, operation is then as described above in the preceding paragraph.

Thus there is provided a simple, economically manufactured valve device made of a minimum number of parts adapted to operate efficiently in any position, and with the ability to operate at extremely low pressures.

Without further description it is believed that the advantages of the present invention over the prior art is apparent and while only one embodiment of the same is illustrated, it is to be expressly understood that the same is not limited thereto as various changes may be made in the combination and arrangement of the parts illustrated, as will now likely appear to others and those skilled in the art. For a definition of the scope or limits of the invention, reference should be had to the appended claims.

What is claimed is:

1. A selector valve comprising:
two body members;
each of said members having opposed cavities having walls with rim portions;
means for securing said body members together with their respective cavities contiguous in the provision of a chamber;
an inlet port formed in each body member, each inlet connecting with suitable positive pressure lines having positive fluid sources of relative low and high pressure;
a vented outlet port formed in one of said body members leading from said chamber,
said inlet ports when said body members are secured together being in spaced alignment,
the terminus of each inlet port being defined by an annular countersunk portion in the provision of vertically spaced valve seats below the rim of the walls of each respective opposed body cavity; and
a pressure responsive flexible diaphragm clamped between said body members at a peripheral portion thereof extending between said opposed cavities and said vertically spaced valve seats,
said diaphragm having a central valve portion for selective seating on said valve seats by differential pressures across said diaphragm to cut off the inlet port having the lower pressure,
and a plurality of openings formed in said diaphragm adjacently spaced with respect to said central valve portion radially outward of the respective valve seats,
said openings permitting discharge of control pressure from the said vented outlet port regardless of which inlet port is cut off by said valve.

2. Pressure selector control means in a chamber responsive to the algebraic sum of increasing gradual pressure differential between two different positive pressure sources of fluid for cutting off communication of the one of the two sources having the lowest magnitude of pressure to said chamber, upon a sufficient increase in the algebraic sum of the different fluid pressures from the two fluid pressure sources, comprising:
a casing formed with a cylindrical chamber;
inlet port means formed in opposite walls of said chamber;
a fluid outlet port means formed in a wall of said chamber for alternately cooperating to communicate with the one of the inlet sources having the highest pressure to discharge the fluid emitted to the exclusion of the lowest inlet pressure source from the one of said inlet port means having the highest inlet pressure to said chamber;
the inlet port means being spaced from each other and forming valve seat means; and
a flexible diaphragm mounted in said chamber between and spaced from said respective spaced valve seat means, said diaphragm having a central impervious valve portion alternately engageable with said respective seat means and a plurality of apertures formed in said diaphragm radially outwardly of said central valve portion and said respective spaced valve seat means, said gradual increase of the algebraic sum of the pressure differential between the two different inlet sources when of sufficient magnitude to overcome the inertia of said diaphragm at said mean position between said valve seat means flexing said diaphragm to seat said central valve portion on the one of said valve seat means adjacent the inlet port having the lower pressure, to thereby selectively exhaust the inlet port having the higher pressure through said outlet port means to control a pressure operated device.

3. Pressure selector control means as set forth in claim 2, wherein the said flexible diaphragm comprises a thin sheet of fabric and an elastomer coating.

References Cited by the Examiner

UNITED STATES PATENTS

| | | | |
|---|---|---|---|
| 1,506,012 | 8/1924 | Lewis | 137—102 X |
| 2,936,998 | 5/1960 | Loepsinger | 251—331 |
| 3,042,062 | 7/1962 | Halloway | 137—112 |
| 3,084,707 | 4/1963 | Frye | 137—102 |
| 3,092,130 | 6/1963 | Hewitt | 137—112 |

FOREIGN PATENTS 208,808  6/1957  Australia.

ISADOR WEIL, *Primary Examiner.*

WILLIAM F. O'DEA, *Examiner.*

R. MASSENGILL, D. ZOBKIW, *Assistant Examiners.*